United States Patent [19]
Heudorfer et al.

[11] Patent Number: 6,152,867
[45] Date of Patent: Nov. 28, 2000

[54] METHOD AND APPARATUS FOR COMPACTLY FOLDING AN AIRBAG FOR AN AIRBAG APPARATUS IN MOTOR VEHICLES

[75] Inventors: Benedikt Heudorfer, Nersingen; Stefan Bär, Ulm, both of Germany

[73] Assignee: Takata (Europe) Vehicle Safety Technology GmbH, Ulm, Germany

[21] Appl. No.: 09/184,585

[22] Filed: Nov. 3, 1998

[30] Foreign Application Priority Data

Nov. 3, 1997 [DE] Germany .............................. 197 48 499

[51] Int. Cl.⁷ ........................................................ B31F 1/00
[52] U.S. Cl. .......................... 493/451; 493/457; 493/458; 493/454; 493/405
[58] Field of Search ..................... 493/457, 451, 493/456, 458, 455, 454, 941, 463, 464, 409, 405; 242/388.1, 532.6, 443

[56] References Cited

U.S. PATENT DOCUMENTS

| | | | |
|---|---|---|---|
| 2,589,792 | 3/1952 | Frank et al. .............................. | 493/457 |
| 2,902,535 | 9/1959 | Francis .................................... | 493/451 |
| 4,544,145 | 10/1985 | Norlander . | |
| 5,174,896 | 12/1992 | Harms, II ................................ | 493/941 |
| 5,779,175 | 7/1998 | Shirahase . | |
| 5,800,328 | 9/1998 | Berti ....................................... | 493/940 |
| 5,803,892 | 9/1998 | Marotzke ................................ | 493/451 |

FOREIGN PATENT DOCUMENTS 44 40 845  5/1996  Germany .

*Primary Examiner*—Peter Vo
*Assistant Examiner*—Sam Tawfik
*Attorney, Agent, or Firm*—Foley & Lardner

[57] ABSTRACT

A method and apparatus for compactly folding an airbag of an airbag apparatus adapted for use in motor vehicles. One side of the airbag has a central opening for connection to a gas generator, with a reinforcement preferably around the central opening. The airbag is laid out flat, is held at its center and the zones lying radially outside of the center are turned in around an axis extending at least substantially perpendicular to the flatly laid out gas bag through the central firm holding zone in at least one direction of rotation until a compact airbag package is formed. One embodiment of the invention includes radially disposed axial shifting members, which leave a reception space radially inward and which displace the flexible material of the flatly laid out airbag alternatively, as seen in the circumferential direction in the one or other axial direction before the airbag is wound up. This is done in such a way that the airbag adopts a corrugated or zigzag like course when seen in the circumferential direction, with the wave-shape and wavelength being selected such that with a synchronous rotation of the axial shifting members about the axis, the zones of the wave-like or zigzag folded airbag lying radially outside of the central firm holding zone are at least substantially taken along in the circumferential direction by the axial shifting members. The winding takes place until the compact airbag package is formed and located radially within the axial shifting members with the formation of radial folds pointing alternatively in opposite axial directions in the receiving space.

38 Claims, 6 Drawing Sheets

METHOD AND APPARATUS FOR COMPACTLY FOLDING AN AIRBAG FOR AN AIRBAG APPARATUS IN MOTOR VEHICLES

BACKGROUND OF THE INVENTION

1. Field of the Invention

The invention relates to a method and an apparatus for compactly folding an airbag, or gas sack, of an airbag apparatus in vehicles, particularly motor vehicles.

2. Description of the Prior Art

In a known method of folding an airbag of an airbag apparatus (DE 44 40 845 A1), the folding of the flat airbag is to take place substantially by a relative rotation between at least two wall sections. For this purpose, the flattened and spread out airbag is clamped at a radially outward portion by clamping devices, whereupon the clamping module is rotated relative to the central holding device. Through this rotary movement, the outer diameter of the airbag is reduced, necessitating the radially inward movement of the clamping devices. Due to the superimposing of the rotary movement of a clamping location relative to the central inward opening with the translatory radially inward movement, the clamping locations of the airbag and the clamping devices move on a spiral track towards the inlet opening. During this movement, the wall of the airbag is arranged in a coil-like manner around the inlet opening. In the fully turned in state of the airbag its entire wall is arranged generally in a bead-like or tire-like manner around the inlet opening, with the clamping locations coming to lie at the outer surface of the folded airbag. The rotary movement is continued until the desired folding packing density is achieved.

A disadvantage of this known method is that the folding of the two sheets of the airbag, which takes place during winding, proceeds in a relatively uncontrolled manner so that the shape of the finally obtained compact airbag package is not precisely reproducible.

SUMMARY OF THE INVENTION

It is an object of the invention is to provide a method and an apparatus for folding an airbag in a simple manner, so that the ultimately formed compact airbag package always adopts at least substantially the same shape.

It is another object of the invention to provide an apparatus that is moveable to facilitate loading and unloading of an airbag.

It is yet another object of the invention to allow for a predetermined shape of the folded airbag to be easily reproducible.

It is a further object of the invention to provide a workspace that is adjustable to account for varying airbag thicknesses.

It is yet a further object of the invention to provide an apparatus which will prevent tearing of the airbag during winding.

The objects are achieved via a method, comprising placing the airbag onto a lower rotary disc; mounting a central opening of a lower reinforcement onto a clamping spigot; engaging a plurality of rotary securing pins into a plurality of vertical bores in said lower reinforcement; lowering an upper rotary disc until a plurality of screws come into contact with the lower rotary disc, wherein the airbag is clamped between an upper shaft and a lower shaft; and rotating the upper rotary disc and the lower rotary disc in a synchronous manner.

Another method is also provided, comprising placing the airbag over a plurality of radial webs of a lower rotary disc; lowering an upper rotary disc; rotating the upper rotary disc and the lower rotary disc; stopping the rotation once a predetermined degree of winding is reached; shifting a plurality of fixing pins axially downward; pivoting the plurality of fixing pins radially inward; and reversing the rotation of the upper rotary disc and the lower rotary disc.

To achieve the aforementioned objects, an apparatus for compactly folding an airbag is provided, comprising a lower rotary disc; a plurality of vertically upright webs secured to said lower rotary disc; and an upper rotary disc, wherein said upper rotary disc is moveable in an axial direction.

Another apparatus is provided and comprises a lower rotary disc; a plurality of vertically upright webs secured to said lower rotary disc; an airbag, wherein said airbag is laid over said plurality of vertically upright webs and said lower rotary disc; an upper rotary disc, wherein said upper rotary disc is moveable in an axial direction; and a plurality of radial webs displaceably mounted in a plurality of through-going slots of said upper rotary disc, wherein said airbag forms a zigzag shape between said plurality of radial webs of said upper rotary disc and said plurality of vertically upright webs of said lower rotary disc.

Further objects, features, and advantages of the present invention will be readily apparent from consideration of the detailed description of the preferred embodiment which follow.

BRIEF DESCRIPTION OF THE DRAWINGS

The invention will be described by way of example and with reference to the drawings, which are incorporated in and constitute part of the specification.

DETAILED DESCRIPTION OF THE PREFERRED EMBODIMENTS

The method of the invention is preferably continued until the airbag is packaged in a container, which can be broken open, and is arranged in a motor vehicle.

As a result of the measures in accordance with the invention, the flatly spread out airbag receives a corrugated or zigzag-like shape, which is enforced by the axial shifting means prior to winding the air-bag in the circumferential direction. The depth of the valleys of the corrugations or the height of the crests of the corrugations are to be selected in such a way that during the rotation of the axial shifting means these do not slide in the peripheral direction along the firmly held airbag but rather at least substantially move it along in the peripheral direction radially outside of the firm holding zone. A well defined radial folding of the airbag is achieved as a result of the corrugated or zigzag shape. Accordingly, not only is an unambiguous shape of the compact airbag package reproduced during winding, but the airbag package is also of particularly compact design.

Advantageous further developments arise because the corrugated or zigzag shape of the airbag is particularly accurately predetermined by the radial webs and rotary discs.

During winding the axial forces exerted radially inwardly on the airbag can under some circumstances reach values which extend up to the tearing limit of the fabric material, which is avoided by peripheral securing pins being peripherally mounted in the through-going slots of the upper rotary disc.

The spacing between the rotary discs varies not only for introducing an airbag or removing a compact airbag package but also varies for selectively achieving different size folds.

It is particularly advantageous when the airbag, after first being turned in one direction of rotation, is subsequently turned in with the already turned in part being firmly held by peripheral holding means.

The direction of rotation during winding up of the airbag is preferably changed one to three times.

Figure 1:
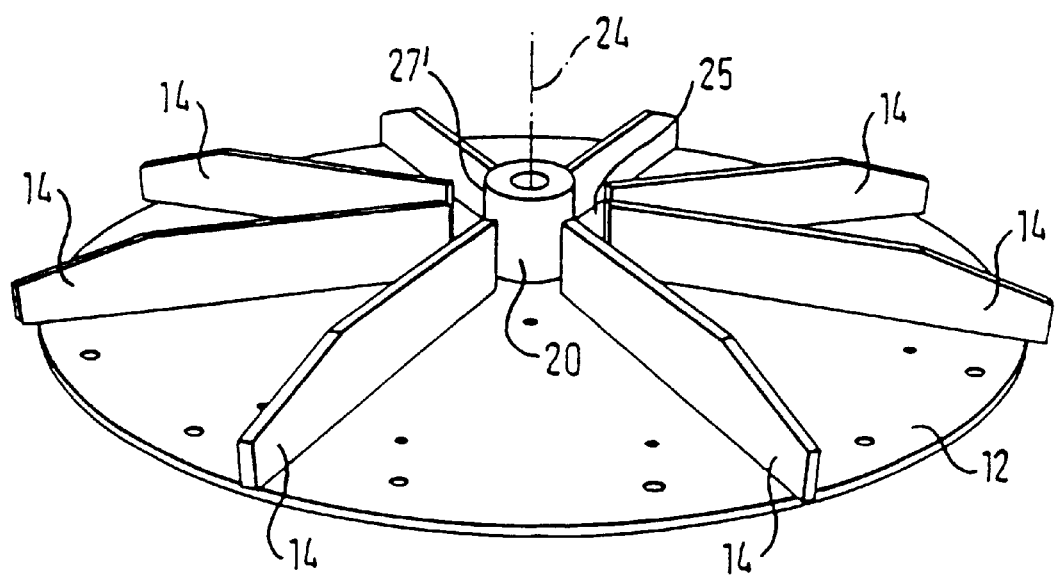
FIG. 1 is a perspective oblique view of the lower rotary disc of an apparatus in accordance with the invention compactly folding an airbag of an airbag apparatus.
Figure 5:
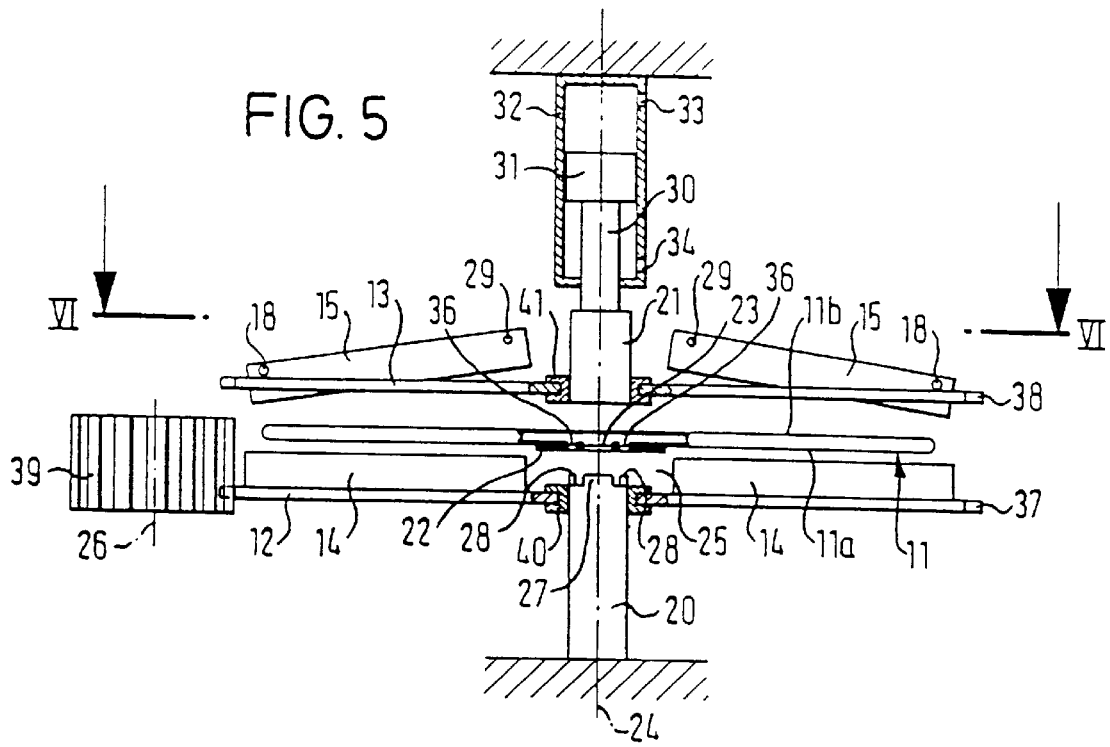
FIG. 5 is a schematic central vertical section through an apparatus in accordance with the invention with a flat airbag laid in place.

In accordance with FIGS. 1 and 5, a total of eight or twelve (FIG. 6) vertically upright radial webs 14 are secured onto a lower rotary disc 12 at uniform peripheral intervals. The radial webs 14 have an upper edge extending substantially parallel to the rotary disc 12, which, in the embodiment of FIG. 1, slope downward somewhat in the radially outward region of the radial webs 14. Toward the middle, the radial webs 14 terminate at a distance (or space) from the central vertical axis 24 of rotation of the rotary disc 12 such that a central receiving space 25 is formed between the central axis 24 and the radially inner edges of the radial webs 14.

In accordance with FIG. 5, the lower rotary disc 12 is rotationally mounted around the central axis 24 at the upper end of a rotationally fixed, and preferably axially fixed, vertically arranged shaft 20 by means of a rotary bearing 40.

The shaft 20 has a central clamping spigot 27 at its top or upper surface and, somewhat further radially outward, rotation securing pins 28 extending upward away from the shaft 20.

In the embodiment of FIG. 1 the shaft 20 has a head 27' at its upper surface end serving both to clamp and to secure rotationally the airbag 11 (FIGS. 2, 5) in a manner which will be described later.

Figure 3:
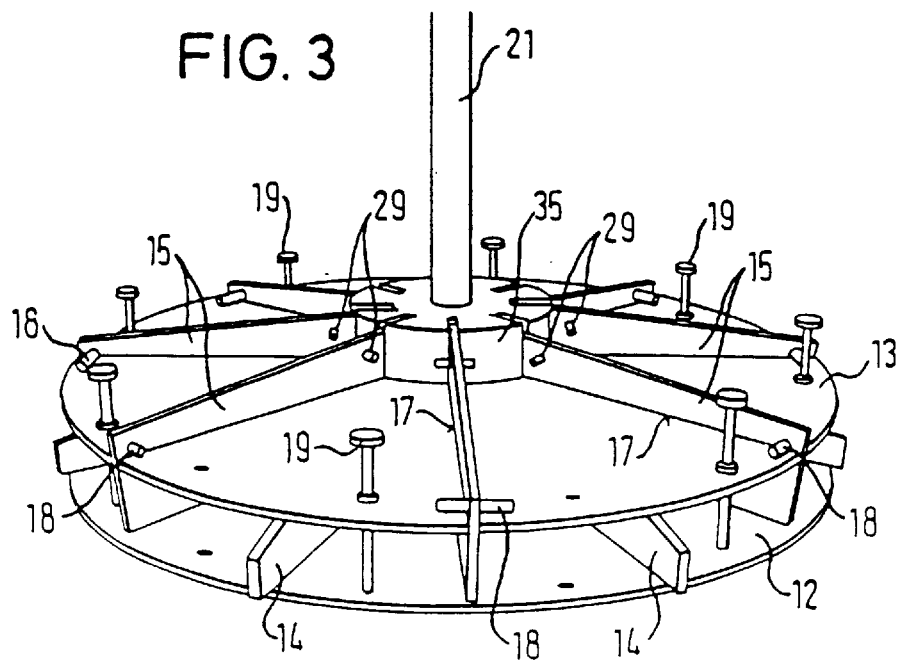
FIG. 3 is a corresponding perspective view, with the upper rotary disc in the operating state placed onto the lower rotary disc, i.e., ready to wind an airbag arranged between the two rotary discs.

In accordance with FIGS. 3 and 5, a second rotary disc 13 is provided above and vertically spaced from the first rotary disc 12 having eight or twelve (FIG. 6) radially through-going slots 17, which are uniformly distributed around the periphery. The radially through-going slots have vertically extending radial webs 15 displaceably mounted therein. The radial webs 15 are rotatably mounted radially outwardly about peripheral axes 18 at the upper rotary disc 13 and have, radially inward and at the top, peripheral securing pins 29. The pins 29 ensure that the radial webs 15, having swung downward due to gravitational force, can pivot downward only about the axes 18 to such an extent that they adopt a substantially horizontal position in which they project just as far down from the upper rotary disc 13 as the radial webs 14 project up from the lower rotary disc 12. The upper radial webs 15 are shown in their upward pivoted position in FIGS. 3 and 5 to demonstrate their pivotal nature.

In accordance with FIG. 5, the upper rotary disc 13 is rotationally journaled in rotary bearings 41 on a rotationally fixed shaft 21 which projects up from the upper rotary disc 13. The shaft 21 is connected and guided vertically via a piston rod 30 to a piston 31, which is displaceable in a vertically upright hydraulic cylinder 32. The piston is displaceable by supplying a hydraulic pressure medium either through an upper inlet opening 33 or through a lower inlet opening 34. By supplying the pressure medium into the upper opening 33 and discharging it from the lower opening 34, the piston 31 and, thus the shaft 21, can be displaced downward together with the upper rotary disc 13 and the radial webs 15 in the direction of the lower rotary disc 12 arranged coaxial to it. By supplying the hydraulic pressure medium through the lower opening 34 and discharging it through the upper opening 33, the shaft 21 with the upper rotary disc 13 can be lifted. The lower rotary disc 12 is preferably stationary in the vertical direction.

In the embodiment of FIG. 3, the upper rotary disc 13 has a central hub 35, which takes on the rotary journaling function on the shaft 21.

As seen in the embodiment of FIG. 5, the rotary discs 12, 13 are rotatably but axially non-displaceably journaled on the shafts 20, 21. It is also possible, however, to mount at least the upper rotary disc 13 so that it is axially displaceable on the non-rotatable upper shaft 21 in such a way that the vertical movement of the upper rotary disc 13 takes place through vertical displacement on the upper shaft 21, which is vertically stationary in this case. In this embodiment, the shafts 20, 21 should also be moveable toward the another to clamp the airbag 11.

In accordance with FIG. 3, screws 19 are screwed into vertically threaded bores in the upper rotary disc 13 extending to the lower rotary disc 12 and are braced against the lower rotary disc 12. By turning the screws 19 into the threaded bores of the upper rotary discs 13 to a greater or lesser depth, a predetermined working space can be set between the rotary discs 12, 13. For the sake of easy viewing, the screws 19, which ensure a predetermined working space between the rotary discs 12, 13, are not shown in FIGS. 5, 6.

In accordance with FIG. 5, a flat, fully spread airbag 11 consisting of two circular cut pieces is arranged between the rotary discs 12, 13; the rotary discs 12, 13 being spaced from one another by the maximum amount. The airbag 11 has a reinforcement 22 around the central, lower side of its central opening 23. The airbag 11 is later connected to a gas generator via the reinforcement 22.

In accordance with the invention, the central clamping spigot 27 of the shaft 20 is dimensioned so that it fits into the central opening 23 of the reinforcement 22 extending around it. To ensure a rotationally fixed connection between the reinforcement 22 extending around the opening 23 and the shaft 20, vertical bores 36 are provided at the reinforcement 22, into which the rotation securing pins 28 at the upper end of the shaft 20 engage when the airbag 11 is lowered out of the position shown in FIG. 5.

Figure 6:
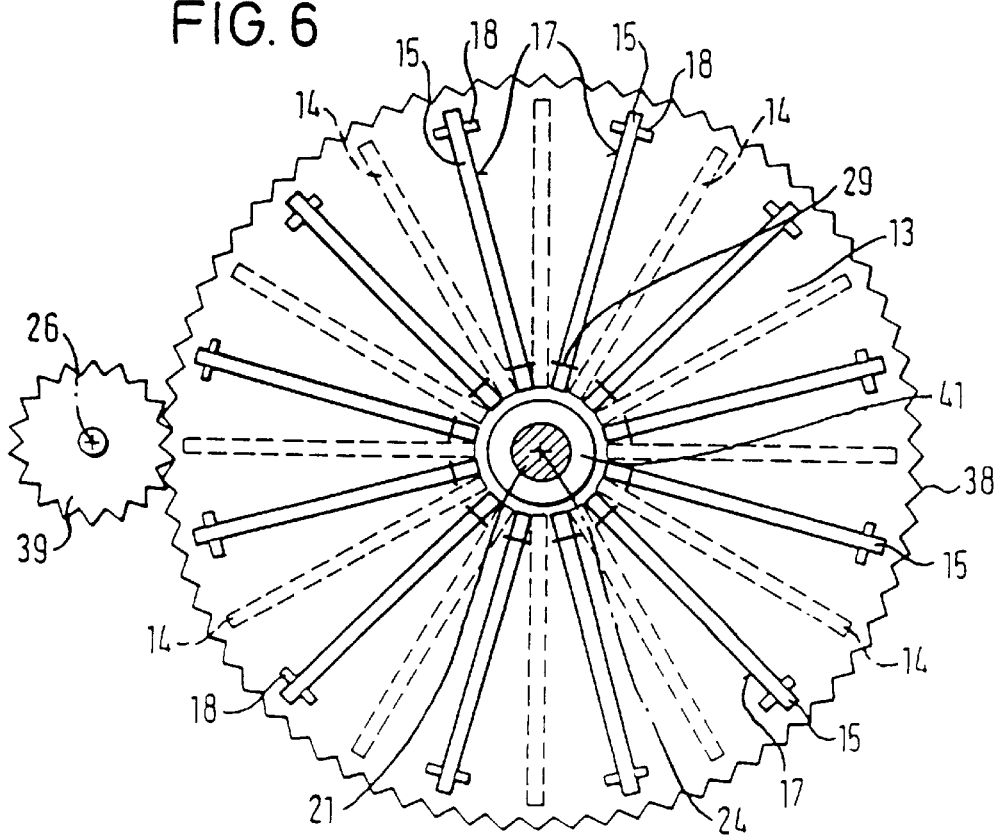
FIG. 6 is a schematic sectional view of the device of FIG. 5 in accordance with the line VI—VI in FIG. 5.

In accordance with FIGS. 5 and 6, the rotary discs 12, 13 can be provided at their periphery with toothed rings 37, 38, respectively, in which a pinion 39 with a vertical axis 26 engages. The pinion can be driven to execute a rotary movement. The engagement of the upper rotary disc 13 into the pinion 39 first takes place when the upper rotary disc 13 has been moved from its uppermost position of FIG. 5 into its lower working position, as seen in FIG. 3.

The operation of the above described apparatus will be explained in detail below also with reference to FIGS. 2, 4 and 7.

Figure 2:
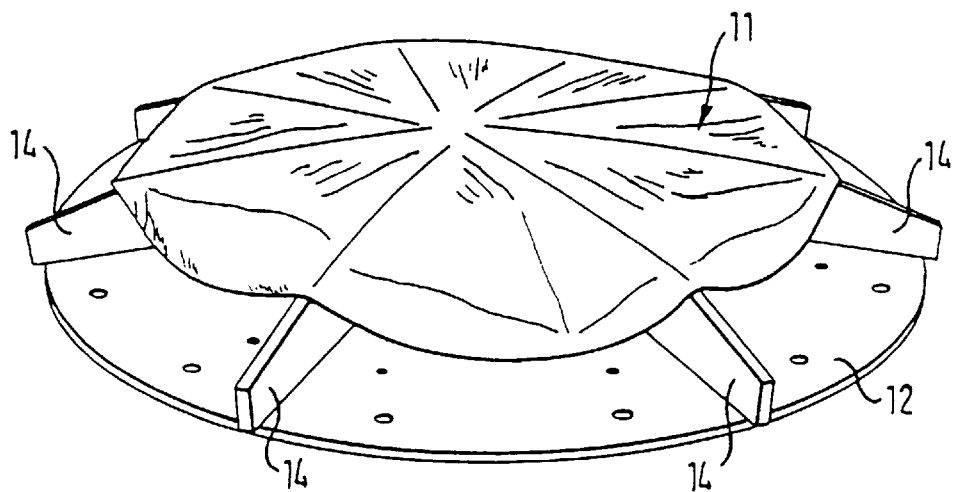
FIG. 2 is a corresponding perspective view, with the airbag spread out flat.

The flat spread out airbag 11 is first placed onto the lower rotary disc 12, as shown in FIG. 2, with the rotary discs 12, 13 separated by the maximum amount in accordance with FIG. 5. In this respect, the central opening 23 shown in FIG. 5 of the lower reinforcement 22 of the airbag 11, which extends around the central opening 23, but which is not visible in FIG. 2, is pushed onto the clamping spigot 27. At the same time, the rotary securing pins 28 engage from below into the vertical bores 36 of the reinforcement 22 to rotationally fixedly connect the lower layer of the airbag 11 to the stationary shaft 20. For the sake of illustration, the upper rotary disc 13 has been omitted in the representation of FIG. 2.

The shaft 21 with the upper rotary disc 13 is now displaced downward by lowering the piston 31 (FIG. 5), with the rotary disc 12 displaced through a half pitch in the peripheral direction, until the screws 19 come to lie on the lower rotary disc 12 as seen in FIG. 3. At the same instant, the lower end face of the upper shaft 21 contacts the clamping spigot 27 through the intermediary of the upper layer of the airbag 11, thereby clamping the upper layer of the airbag 11 between the two shafts 20, 21.

Figure 4:
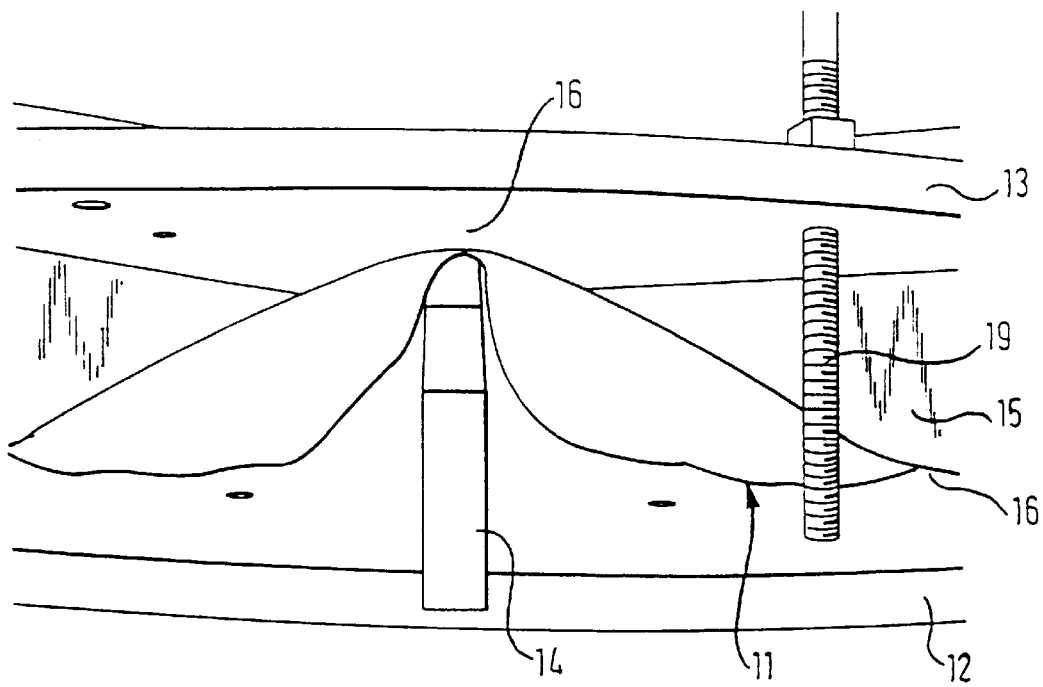
FIG. 4 is an enlarged radial view from the outside in the region of a radial web of the lower rotary disc to illustrate the deformation of the airbag arranged between the two rotary discs.

When the upper rotary disc 13 is in a lowered position, the radial webs 14, 15 vertically overlap as seen in FIGS. 3 and 4. The overlap, however, only goes so far that a gap 16 remains between each upper edge of the lower radial webs 14 and the upper rotary disc 13, and/or between each lower edge of the upper radial webs 15 and the lower rotary disc 12 of FIG. 4. In this state, the material of the airbag 11 is located unclamped in the gap 16 so that it can slide in the gap 16, particularly in the radial direction.

Next, the two rotary discs 12, 13 are synchronously rotated by means of the gearwheel 39 (FIGS. 5, 6) in one direction, and because the inner region of the airbag 11 is being firmly held, the radially outer regions of the airbag 11 are turned in around the central region. The radial webs 14,15 may extend axially only to the extent that the regions of the airbag 11 lying outside of the central clamping region participate in the synchronous rotational movement of the rotary discs 12, 13. During this rotational movement of the unit, defined radial folds are formed by the radial webs 14, 15, and are wound compactly around the central region so that ultimately a compact airbag package 11 is formed in the receiving space 25, as can be seen in FIG. 7 (note: the upper rotary disc 13 is omitted for the sake of easier viewing).

In order to avoid excessive axial forces from acting on the airbag material during winding, the upper radial webs 15 are mounted in such a way that they can deviate axially in the above described manner, so that the radial webs 15 can be pushed upward by the material located in the turned in region thereby effectively avoiding the airbag being torn and the defined fold formation is not impaired.

Figure 7:
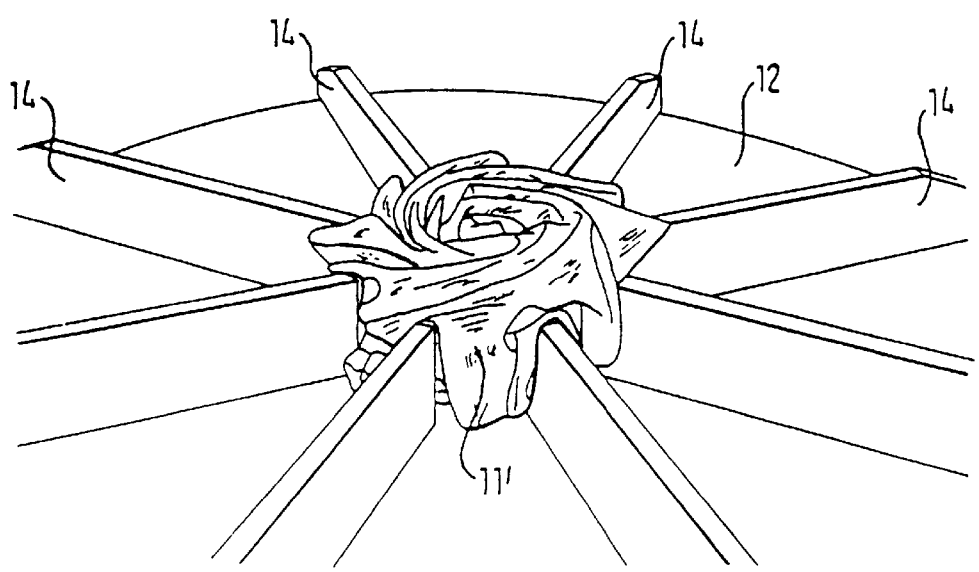
FIG. 7 is an enlarged, perspective, oblique view of the lower rotary disc of an apparatus in accordance with the invention, with the fully turned in compact airbag package arranged in the radially inner receiving space and with the upper rotary disc removed for better visibility.

After the airbag 11 is completely and compactly folded, as seen in FIG. 7, the airbag 11 is introduced into a container which can be broken open and whereupon the attachment of the sheet metal mounting is attached to the gas generator. The finished airbag apparatus can now be installed at a suitable position in a motor vehicle.

The basic concept of the apparatus of the invention thus consists in arranging the airbag within the two rotary discs 12, 13 and fixing it at the center. The airbag thereby forms a type of zigzag pattern between the two rotary discs. The diameter of the two discs depends on the size of the airbags to be folded. A high-strength material should be used as the material for the rotary discs and radial webs.

The radial webs 14, 15 can have a height of approximately 1 cm and a radius of R5, so that the airbag 11 is not damaged, but also participates in the rotary movement. The axial height of the radial webs 14, 15 should amount to several centimeters. The upper radial webs 15 are principally designed in the same way as the lower radial webs 14, but should have a somewhat greater height so that two bores in the upper region may be provided, one serving to receive the peripheral axle 18 and the other for arranging the securing pins 29.

Figure 8:
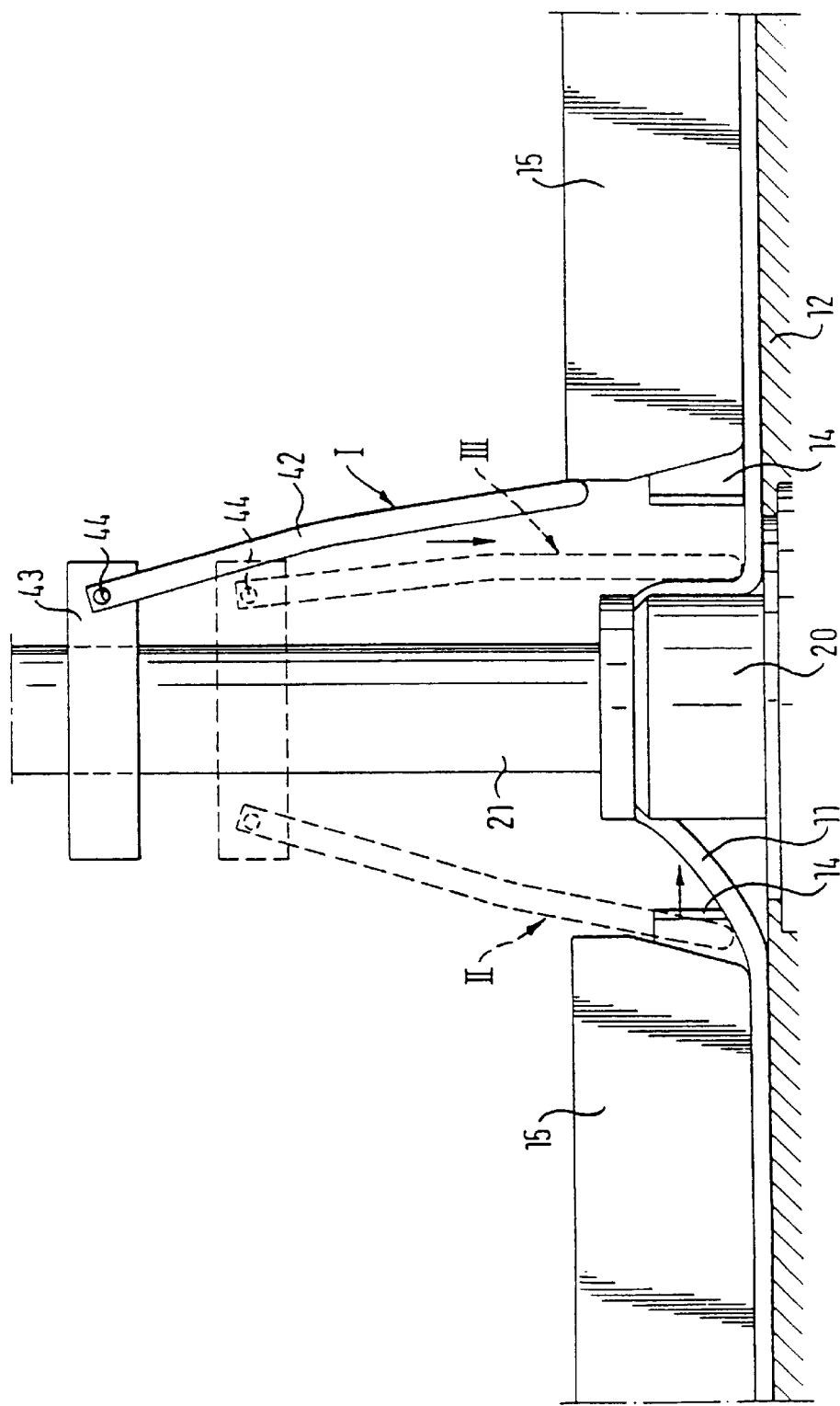
FIG. 8 is an enlarged sectional view analogous to FIG. 5, but with only the radially inner region of the apparatus of the invention being shown and with the airbag shown in its clamped position and, additionally, peripheral holding means in accordance with the invention are shown in three different working positions.

In accordance with FIG. 8, a vertically displaceable but rotationally fixed shifting block 43 is provided on the upper shaft 21. A fixing pin 42 is mounted on the shifting block 43 via a peripherally directed hinge 44 in the region of each upper radial web 15 distributed around the periphery of the shifting block such that each fixing pin 42 can be moved both axially and also radially inward. Each fixing pin 42 extends substantially downward from the shifting block 43 to a point somewhat above the clamped airbag 11.

In FIG. 8, the fixing pin 42 is shown in its upper, inactive position I and is shown a second time in broken lines in the axially downward displaced position II relative to the turned in airbag. Finally, the pin 42 is shown a third time, also in broken lines, in the axially downward shifted but also radially inward turned position III. In position III, the already turned in airbag part is fixed in the peripheral direction such that winding in the opposite direction of rotation is subsequently possible.

Figure 9:
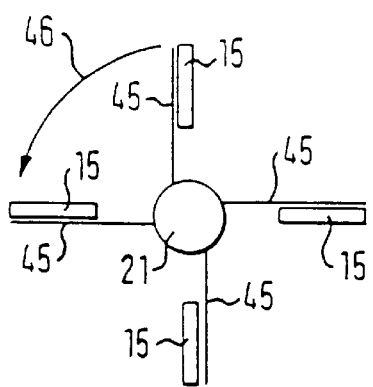
FIGS. 9 to 13 are schematic plan views of advantageous further developments of the invention in accordance with FIG. 8 in various stages of the winding process.

FIG. 9 shows, in schematic plan view, an apparatus in accordance with the invention having four radial webs 15, displaced, in each case, 90° in the circumferential direction, at the start of the winding procedure. This procedure takes place in the direction of the arrow 46 with the formed airbag folds being indicated at 45.

Figure 10:
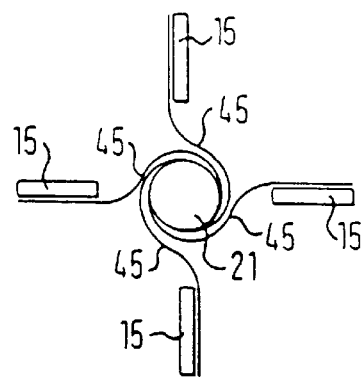

FIG. 10 illustrates how the folded airbag with the folds 45 is wound around the central clamping position beneath the shaft 21.

Figure 11:
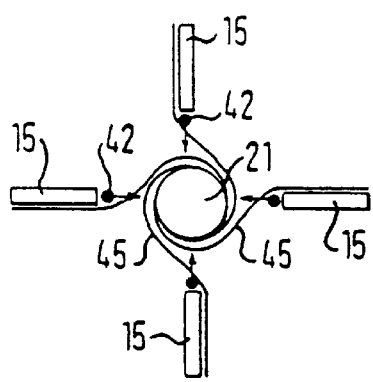

As soon as a certain degree of winding is achieved, e.g., 50%, in accordance with FIG. 11, the direction of rotation of the rotary discs 12, 13 is stopped and the fixing pins 42 are shifted axially downward into position II as shown in FIG. 8. Thereafter, the fixing pins 42, which are fixed in the peripheral direction, are pivoted about the hinge 44 radially inward from position II to position III of FIG. 8 until they finally reach the position illustrated in FIG. 12. In this way the already turned in airbag is effectively prevented from rotating open again.

Figure 12:
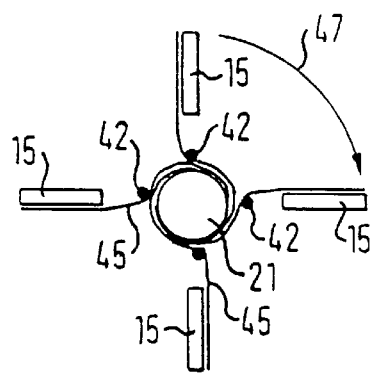

The rotary discs 12, 13 are now rotated in the opposite direction in accordance with arrow 47 in FIG. 12 until finally the radially outer regions of the airbag with the folds 45 are fully turned in. This end position is reproduced in FIG. 13.

Figure 13:
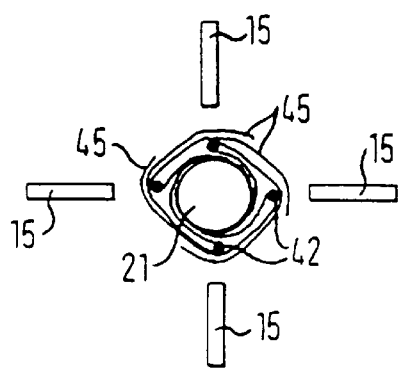

Should the airbag not yet be fully turned in when the position of FIG. 13 is reached, then the fixing pins 44 can be axially extracted by moving the shifting block of FIG. 8 upward from the already finished part of the turned in airbag and engaged with the airbag 11 radially further outward. At this point, the remaining part of the airbag is completed by winding in a direction that is opposite from the most recent winding direction.

The radially outermost position of the fixing pins 42 can be achieved and held by suitable bias means, for example springs and optionally abutments.

The invention in its broader aspects is not limited to the specific details and representative devices shown and described above. Hence, various modifications may be made without departing from the spirit or scope of the invention as defined by the appended claims and their equivalents.

Priority application German 19748499.9 filed Nov. 3, 1997, including the specification, claims, drawings, and abstract, is hereby incorporated by reference.

What is claimed is:

1. A method for compactly folding an airbag, comprising:
   a) placing the airbag over a plurality of vertically upright radial webs of a lower rotary disc;
   b) lowering an upper rotary disc having a plurality of vertically downwardly-directed radial webs, wherein the airbag is clamped between an upper shaft and a lower shaft, thereby imparting a circumferential zigzag shape to the airbag; and
   c) rotating the upper rotary disc and the lower rotary disc in a synchronous manner.

2. A method for compactly folding an airbag according to claim 1, wherein the upper rotary element and the lower rotary element are rotated in only one direction.

3. A method for compactly folding an airbag according to claim 1, further comprising the step of reversing the direction of rotation of the upper rotary element and the lower rotary element.

4. A method for compactly folding an airbag according to claim 3, further comprising the step of holding an already folded portion of the airbag prior to the reversing step.

5. A method for compactly folding an airbag, comprising:
   a) placing the airbag over a plurality of radial webs of a lower rotary element;
   b) lowering an upper rotary element;
   c) rotating the upper rotary element and the lower rotary element;
   d) stopping the rotation once a predetermined degree of winding is reached;
   e) shifting a plurality of fixing pins axially downward;
   f) pivoting the plurality of fixing pins radially inward; and
   g) reversing the rotation of the upper rotary element and the lower rotary element.

6. A method for compactly folding an airbag according to claim 5, further comprising the steps of:
   h) extracting said fixing pins by lifting a shifting block; and
   i) reversing the rotation of the upper rotary element and the lower rotary element.

7. An apparatus for compactly folding an airbag comprising:
   a lower rotary disc;
   a plurality of vertically upright radial webs secured to said lower rotary disc;
   an upper rotary disc, wherein said upper rotary disc is moveable in an axial direction;
   a plurality of through-going slots in said upper rotary disc; and
   a second plurality of radial webs displaceably mounted in said through-going slots.

8. An apparatus for compactly folding an airbag as claimed in claim 7, wherein said second plurality of radial webs are uniformly distributed around a periphery of said upper rotary element.

9. An apparatus for compactly folding an airbag as claimed in claim 8, wherein said second plurality of radial webs are rotatably mounted outward about a peripheral axis of said upper rotary element.

10. An apparatus for compactly folding an airbag as claimed in claim 9, wherein each of said second plurality of radial webs has a peripheral securing pin.

11. An apparatus for compactly folding an airbag, comprising:
   a lower rotary disc;
   a plurality of vertically upright radial webs secured to said lower rotary disc;
   an upper rotary disc, wherein said upper rotary disc is moveable in an axial direction; and
   an upper shaft and at least one rotary bearing mounted to said upper shaft, wherein said upper rotary disc is rotationally journaled in said bearing,
   wherein said upper shaft is connected to a piston via a piston rod.

12. An apparatus for compactly folding an airbag as claimed in claim 11, wherein said piston is displaceable in a hydraulic cylinder.

13. An apparatus for compactly folding an airbag, comprising:
   a lower rotary disc;
   a plurality of vertically upright radial webs secured to said lower rotary disc, wherein each of said plurality of vertically upright radial webs has an upper edge extending substantially parallel to a surface of said lower rotary disc; and
   an upper rotary disc, wherein said upper rotary disc is moveable in an axial direction,
   wherein said upper edge of each of said plurality of vertically upright radial webs slopes down toward an outer edge of each of said webs.

14. An apparatus for compactly folding an airbag as claimed in claim 13, further comprising a central receiving space in said lower rotary element.

15. An apparatus for compactly folding an airbag as claimed in claim 14, wherein said central receiving space is defined by an area between an inner edge of each of said plurality of vertically upright radial webs and a central axis of rotation of said lower rotary element.

16. An apparatus for compactly folding an airbag, comprising:
   a lower rotary disc;
   a plurality of vertically upright radial webs secured to said lower rotary disc;
   an upper rotary disc, wherein said upper rotary disc is moveable in an axial direction; and
   a lower shaft fixedly connected to said lower rotary disc,
   wherein said lower shaft is fixed in a rotational direction.

17. An apparatus for compactly folding an airbag as claimed in claim 16, further comprising
   a central clamping spigot at an upper surface of said lower shaft.

18. An apparatus for compactly folding an airbag as claimed in claim 17, wherein said central clamping spigot is integrally formed to an upper surface of said lower shaft.

19. An apparatus for compactly folding an airbag as claimed in claim 16, further comprising a plurality of rotation securing pins at an upper surface of said lower shaft and radially outward from a central axis.

20. An apparatus for compactly folding an airbag as claimed in claim 16, wherein said lower shaft is fixed in an axial direction.

21. An apparatus for compactly folding an airbag comprising:

a lower rotary disc;

a plurality of vertically upright radial webs secured to said lower rotary disc;

an upper rotary disc, wherein said upper rotary disc is moveable in an axial direction; and a central hub mounted to said upper rotary disc, wherein said central hub is adapted to rotationally journal said upper rotary disc on an upper shaft.

22. An apparatus for compactly folding an airbag, comprising:

a lower rotary disc;

a plurality of vertically upright webs secured to said lower rotary disc;

an upper rotary disc, wherein said upper rotary disc is moveable in an axial direction; and a pinion for driving said upper rotary disc and said lower rotary disc, wherein said upper and lower rotary discs have teeth provided at an outer edge.

23. An apparatus for compactly folding an airbag as claimed in claim 22, wherein said pinion rotates about a vertical axis of rotation.

24. An apparatus for compactly folding an airbag, comprising:

a lower rotary disc;

a plurality of vertically upright webs secured to said lower rotary disc;

an upper rotary disc, wherein said upper rotary disc is moveable in an axial direction; and a plurality of screws screwed into a plurality of threaded bores in said upper rotary disc, wherein said screws are screwed into said upper rotary disc at a predetermined amount and braced against said lower rotary disc to provide a desired working space between said upper and lower rotary discs.

25. An apparatus for compactly folding an airbag, comprising:

a lower rotary disc;

a plurality of vertically upright webs secured to said lower rotary disc;

an upper rotary disc, wherein said upper rotary disc is moveable in an axial direction; and an upper shaft fixedly connected to said upper rotary disc and a shifting block rotationally fixedly connected to said upper shaft.

26. An apparatus for compactly folding an airbag as claimed in claim 25, further comprising a fixing pin mounted on said shifting block.

27. An apparatus for compactly folding an airbag as claimed in claim 26, wherein said fixing pin is mounted on said shifting block by a hinge.

28. An apparatus for compactly folding an airbag, comprising:

a lower rotary element;

a plurality of vertically upright webs secured to said lower rotary element, wherein said plurality of vertically upright webs and said lower rotary element are adapted to be overlaid with the airbag;

an upper rotary element, wherein said upper rotary element is moveable in an axial direction; and a plurality of radial webs displaceably mounted in a plurality of through-going slots of said upper rotary element;

wherein said plurality of radial webs of said upper rotary element and said plurality of vertically upright webs of said lower rotary element are adapted to impart a zigzag shape to said airbag.

29. An apparatus for compactly folding an airbag as claimed in claim 28, further comprising a lower shaft fixedly connected to said lower rotary element, wherein a central clamping spigot of said lower shaft is adapted to be fixedly connected to the airbag.

30. An apparatus for compactly folding an airbag as claimed in claim 28, wherein said airbag is between said upper and lower rotary elements.

31. A method for compactly folding an airbag, comprising:

a) placing the airbag onto a lower rotary disc;

b) mounting a central opening of a lower reinforcement onto a clamping spigot of said lower rotary disc;

c) engaging a plurality of rotary securing pins into a plurality of vertical bores in said lower reinforcement;

d) lowering an upper rotary disc until a plurality of screws come into contact with the lower rotary disc, wherein the airbag is clamped between an upper shaft and a lower shaft;

e) rotating the upper rotary disc and the lower rotary disc in a synchronous manner; and f) reversing a direction of rotation of the upper rotary disc and the lower rotary disc.

32. A method for the compact folding together of an airbag of an airbag apparatus in motor vehicles in which a flatly arranged airbag includes two flexible sheets which are connected together at their periphery, comprising the steps of:

a) flatly laying out one of the sheets having a central opening for the connection of a gas generator;

b) holding said sheet at the center;

c) alternately displacing the flexible material of the flatly laid out sheet, as seen in the circumferential direction, in one or other axial direction before being turned in by radially disposed axial shifting means, which leave a receiving space radially inwardly, whereby the airbag adopts a corrugated or zigzag course when seen in the circumferential direction, with a wave-shape and wavelength being selected such that with a synchronous rotation of the axial shifting means about the axis the zones of the corrugated or zigzag folded airbag lying radially outside of the central firm holding zone are at least substantially taken along in the circumferential direction by the axial shifting means; and d) turning the zones lying radially outside of the center around an axis which extends at least substantially perpendicular to the flatly laid out airbag through the central firm holding zone until a compact airbag package is formed, wherein winding up subsequently takes place until the compact airbag package is formed while forming radial folds pointing alternately in opposite axial directions in the receiving space located radially within the axial shifting means.

33. A method for compactly folding together an airbag of an airbag apparatus in motor vehicles in which a flatly arranged airbag includes two flexible sheets which are connected together at their periphery, comprising the steps of:

a) flatly laying out one of the sheets having a central opening for a connection of a gas generator;

b) holding said sheet at a center;

c) alternately displacing the flexible material of the flatly laid out sheet, as seen in a circumferential direction, in alternating axial directions before being turned in by radially disposed axial shifting means, which leave a receiving space radially inwardly, whereby the airbag adopts a zigzag course when seen in the circumferential direction, with a wave-shape and wavelength being selected such that with a synchronous rotation of the axial shifting means about an axis, a plurality of zones of a zigzag folded airbag lying radially outside of a central firm holding zone are at least substantially taken along in the circumferential direction by the axial shifting means; and d) turning the plurality of zones of the zigzag folded airbag lying radially outside of the central firm holding zone around an axis which extends at least substantially perpendicular to the flatly laid out airbag through the central firm holding zone until a compact airbag package is formed, wherein winding up subsequently takes place until the compact airbag package is formed while forming radial folds pointing alternately in opposite axial directions in the receiving space located radially within the axial shifting means.

34. The method for compactly folding together an airbag as claimed in claim 33, wherein said zones lying radially outside of the center are turned in at least two rotational directions.

35. The method for compactly folding together an airbag as claimed in claim 33, wherein said central opening is provided with a reinforcement around it.

36. An apparatus for compactly folding together an airbag of an airbag apparatus in motor vehicles in which a flatly arranged airbag includes two flexible sheets connected together at their periphery, wherein one of the sheets having a central opening for the attachment of a gas generator is laid out flat, and is held by clamping means at the center, and wherein zones lying radially outside of the center can be turned in at least one direction about an axis extending through a central firm holding zone at least substantially perpendicular to the flatly laid out airbag by radial engagement means lying outside of the firm holding zone until a compact airbag is formed, wherein radially disposed axial shifting means, which are distributed around the axis and leave a receiving space radially inwardly, are provided as the radial engagement means and alternately shift the flexible material of the flatly laid out airbag in alternating axial directions, as seen in a circumferential direction prior to a winding up, in such a way that the airbag adopts a zigzag shape in the circumferential direction, with a wave-shape and wavelength being so selected that, with a synchronous rotation of the axial shifting means about the axis, the zones of the zigzag folded airbag lying radially outside of the central firm holding zone are at least substantially taken along by the axial shifting means; and wherein rotary drive means are provided for the axial shifting means which turn in the zones of the airbag lying radially outside of the central firm holding zone until the compact airbag package is formed through the formation of alternating radial folds pointing alternately in opposite axial directions in the receiving space located radially inside the axial shifting means.

37. An apparatus for compactly folding together an airbag as claimed in claim 36, wherein said central opening is provided with a reinforcement around it.

38. An apparatus for compactly folding together an airbag as claimed in claim 36, wherein said zones lying radially outside of the center are turned in at least two rotational directions.

* * * * *